United States Patent
Pei et al.

(10) Patent No.: US 11,300,684 B2
(45) Date of Patent: Apr. 12, 2022

(54) SCANNING LIDAR SYSTEMS FOR THREE-DIMENSIONAL SENSING

(71) Applicant: Cepton Technologies, Inc., San Jose, CA (US)

(72) Inventors: Jun Pei, Saratoga, CA (US); Mark A. McCord, Los Gatos, CA (US); Jun Ye, Palo Alto, CA (US)

(73) Assignee: Cepton Technologies, Inc., San Jose, CA (US)

( * ) Notice: Subject to any disclaimer, the term of this patent is extended or adjusted under 35 U.S.C. 154(b) by 133 days.

(21) Appl. No.: 16/574,616

(22) Filed: Sep. 18, 2019

(65) Prior Publication Data
US 2020/0096642 A1    Mar. 26, 2020

Related U.S. Application Data

(63) Continuation of application No. 15/267,558, filed on Sep. 16, 2016, now Pat. No. 10,451,740.
(Continued)

(51) Int. Cl.
*G01S 17/89* (2020.01)
*H04N 13/254* (2018.01)
(Continued)

(52) U.S. Cl.
CPC .......... *G01S 17/89* (2013.01); *B60R 1/00* (2013.01); *B60R 11/04* (2013.01); *G01S 7/484* (2013.01);
(Continued)

(58) Field of Classification Search
CPC ...... F21S 41/657; F21S 41/635; F21S 41/176; F21S 41/00; F21V 29/67; G01S 7/4811;
(Continued)

(56) References Cited

U.S. PATENT DOCUMENTS 7,544,945 B2   6/2009  Tan et al.
10,451,740 B2  10/2019 Pei et al.
(Continued)

FOREIGN PATENT DOCUMENTS

JP        3169074 B2     5/2001
JP      2002181533 A     6/2002
(Continued)

OTHER PUBLICATIONS

Notice of Reasons of First Refusal dated Feb. 2, 2021 with English translation of related Japanese Patent Application No. 2018-557022, filed Apr. 3, 2017 (twelve pages).

*Primary Examiner* — Luke D Ratcliffe
(74) *Attorney, Agent, or Firm* — Kilpatrick Townsend & Stockton LLP

(57) ABSTRACT

A lidar system includes a laser source, a photodetector, an emission lens, a receiving lens, and a processor. The laser source is configured to be translated through a plurality of emission locations, and to emit a plurality of laser pulses therefrom. The emission lens is configured to collimate and direct the plurality of laser pulses towards an object. The receiving lens is configured to focus the portion of each of the plurality of laser pulses reflected off of the object to a plurality of detection locations. The photodetector is configured to be translated through the plurality of detection locations, and to detect the portion of each of the plurality of laser pulses. The processor is configured to determine a time of flight for each of the plurality of laser pulses from emission to detection, and construct a three-dimensional image of the object based on the determined time of flight.

20 Claims, 9 Drawing Sheets

Related U.S. Application Data

(60) Provisional application No. 62/327,447, filed on Apr. 26, 2016.

(51) Int. Cl.

| | | |
|---|---|---|
| *H04N 13/239* | (2018.01) | |
| *G01S 7/481* | (2006.01) | |
| *G01S 17/87* | (2020.01) | |
| *G01S 17/10* | (2020.01) | |
| *G01S 7/497* | (2006.01) | |
| *G06T 7/521* | (2017.01) | |
| *G01S 7/486* | (2020.01) | |
| *G01S 17/931* | (2020.01) | |
| *G01S 7/484* | (2006.01) | |
| *G01S 7/4865* | (2020.01) | |
| *B60R 1/00* | (2006.01) | |
| *G01S 17/42* | (2006.01) | |
| *G06T 7/70* | (2017.01) | |
| *B60R 11/04* | (2006.01) | |
| *G06K 9/00* | (2006.01) | |
| *B60R 11/00* | (2006.01) | |

(52) U.S. Cl.
CPC ........... *G01S 7/4811* (2013.01); *G01S 7/4815* (2013.01); *G01S 7/4816* (2013.01); *G01S 7/4817* (2013.01); *G01S 7/4865* (2013.01); *G01S 7/4868* (2013.01); *G01S 7/4972* (2013.01); *G01S 17/10* (2013.01); *G01S 17/42* (2013.01); *G01S 17/87* (2013.01); *G01S 17/931* (2020.01); *G06K 9/00805* (2013.01); *G06T 7/521* (2017.01); *G06T 7/70* (2017.01); *H04N 13/239* (2018.05); *H04N 13/254* (2018.05); *B60R 2011/004* (2013.01); *B60R 2300/103* (2013.01); *B60R 2300/105* (2013.01); *B60R 2300/8093* (2013.01)

(58) Field of Classification Search
CPC ...... G01S 17/87; G01S 17/931; G01S 7/4815; G01S 17/42; G01S 17/10; G01S 17/89; G01S 17/894; G01S 7/4816; G01S 7/4817; G01S 7/484; G01S 7/4865; G01S 7/4868; G01S 7/4972; G06T 7/521; G06T 7/70; H04N 13/254; H04N 13/239; B60R 1/00; B60R 11/04; B60R 2011/004; B60R 2300/103; B60R 2300/105; B60R 2300/8093; G06K 9/00805
See application file for complete search history.

(56) References Cited

U.S. PATENT DOCUMENTS

| | | |
|---|---|---|
| 2004/0141170 A1 | 7/2004 | Jamieson et al. |
| 2007/0181810 A1* | 8/2007 | Tan ................. G01S 7/4811 250/341.1 |
| 2007/0279615 A1* | 12/2007 | Degnan .............. G01S 7/499 356/4.01 |
| 2008/0246943 A1 | 10/2008 | Kaufman et al. |
| 2010/0066995 A1 | 3/2010 | Rindle |
| 2015/0075066 A1 | 3/2015 | Stowe et al. |
| 2015/0296201 A1 | 10/2015 | Banks et al. |
| 2016/0198074 A1 | 7/2016 | Boyle et al. |
| 2017/0184399 A1 | 6/2017 | Thayer et al. |
| 2017/0307758 A1 | 10/2017 | Pei et al. |
| 2019/0301700 A1* | 10/2019 | Yamazumi ........... F21S 41/657 |

FOREIGN PATENT DOCUMENTS

| | | | |
|---|---|---|---|
| JP | 2004-085225 A | | 3/2004 |
| JP | 2004085225 A | * | 3/2004 |
| WO | 2014060562 A1 | | 4/2014 |

* cited by examiner

SCANNING LIDAR SYSTEMS FOR THREE-DIMENSIONAL SENSING

CROSS-REFERENCES TO RELATED APPLICATIONS

This application is a continuation of U.S. patent application Ser. No. 15/267,558 filed Sep. 16, 2016, entitled "SCANNING LIDAR SYSTEMS FOR THREE-DIMENSIONAL SENSING," now U.S. Pat. No. 10,451,740, issued on Oct. 22, 2019 which claims the benefit of and priority to U.S. Provisional Patent Application No. 62/327,447, filed on Apr. 26, 2016, entitled "THREE-DIMENSIONAL SENSING USING SCANNING LIDAR AND STRUCTURED OR SCANNING ILLUMINATION AND METHODS OF USING SAME," the contents of which are hereby incorporated by reference in their entireties for all purposes.

BACKGROUND OF THE INVENTION

Three-dimensional sensors are important for autonomous vehicles, drones, and other applications. They may be used, for example, for obstacle detection in an autonomous vehicle. Long range radar has become a common option for high end automobiles due to its low cost and high reliability. While the angular resolution of a millimeter wave radar (e.g., operating at 72 GHz W band) could be better than 2 degrees, such angular resolution is insufficient to guide autonomous vehicles at high speed. For example, a 200 meter sensing range is usually considered to be necessary for cars travelling at 120 km per hour (i.e., about 33 m/s or 75 mph). It may be calculated that an angular resolution of 0.2 degrees or less is necessary to achieve a spatial resolution of 0.7 m for an object at 200 m away. This spatial resolution would ensure the detection of a normal sized vehicle with at least one pixel. On the other hand, current commercially available three-dimensional sensors based on lidars are very expensive compared to the average selling price of a consumer automobile.

Therefore, an inexpensive lidar system that can deliver high angular resolution in both the horizontal and vertical direction is desired.

SUMMARY OF THE INVENTION

The present invention relates generally to lidar systems for three-dimensional imaging. More specifically, the present invention relates to scanning lidar systems and methods of three-dimensional imaging using inexpensive flexures that are suitable for autonomous vehicles, drones and other applications. Merely by way of example, embodiments of the present invention provide scanning lidar systems that comprise a plurality of laser sources and a plurality of photodetectors configured to be scanned synchronously to provide a desired angular field of view.

According to an embodiment of the present invention, a lidar system for three-dimensional imaging of an object may include a laser source configured to be translated through a plurality of emission locations in an emission plane. The laser source is configured to emit a plurality of laser pulses, wherein each of the plurality of laser pulses is emitted at a respective one of the plurality of emission locations. The lidar system may further include an emission lens configured to collimate and direct the plurality of laser pulses towards the object. A portion of each of the plurality of laser pulses may be reflected off of the object. The lidar system may further include a receiving lens configured to receive and focus the portion of each of the plurality of laser pulses reflected off of the object to a plurality of corresponding detection locations in a detection plane. Each of the plurality of corresponding detection locations is conjugate with a respective one of the plurality of emission locations. The lidar system may further include a photodetector configured to be translated through the plurality of corresponding detection locations in the detection plane. The photodetector is configured to receive and detect the portion of each of the plurality of laser pulses reflected off of the object. The lidar system may further include a processor coupled to the laser source and the photodetector. The processor may be configured to determine a time of flight for each of the plurality of laser pulses from emission to detection, and construct a three-dimensional image of the object based on the determined time of flight for each of the plurality of laser pulses.

In another embodiment, a method of three-dimensional imaging may include translating a laser source to each of a plurality of emission locations in an emission plane, and emitting, using the laser source, a plurality of laser pulses. Each of the plurality of laser pulses is emitted at a respective one of the plurality of emission locations. The method may further include collimating and directing, using an emission lens, the plurality of laser pulses towards an object. A portion of each of the plurality of laser pulses may be reflected off of the object. The method may further include receiving and focusing, using a receiving lens, the portion of each of the plurality of laser pulses reflected off of the object to a plurality of corresponding detection locations in a detection plane. Each corresponding detection location is conjugate with a respective emission location. The method may further include translating a photodetector to each of the plurality of corresponding detection locations in the detection plane, and detecting, using the photodetector, the portion of each of the plurality of laser pulses at each of the plurality of detection locations. The method may further include determining, using a processor, a time of flight for each of the plurality of laser pulses from emission to detection, and constructing a three-dimensional image of the object based on the determined time of flight for each of the plurality of laser pulses.

According to a further embodiment, a lidar system for three-dimensional imaging of an object may include a first laser source configured to be translated through a first plurality of emission locations in an emission plane. The first laser source is configured to emit a first plurality of laser pulses at the first plurality of emission locations, respectively. The lidar system may further include a second laser source configured to be translated through a second plurality of emission locations in the emission plane. The second laser source is configured to emit a second plurality of laser pulses at the second plurality of emission locations, respectively. The lidar system may further include an emission lens configured to collimate and direct the first plurality of laser pulses and the second plurality of laser pulses towards the object. A portion of each of the first plurality of laser pulses and each of the second plurality of laser pulses may be reflected off of the object. The lidar system may further include a receiving lens configured to receive and focus the portion of each of the first plurality of laser pulses and each of the second plurality of laser pulses reflected off of the object to a first plurality of corresponding detection locations and a second plurality of corresponding detection locations in a detection plane. Each of the first plurality of corresponding detection locations is conjugate with a respective one of the first plurality of emission locations; and each of the second plurality of corresponding detection locations is conjugate with a respective one of the second plurality of emission locations. The lidar system may further include a first photodetector configured to be translated through the first plurality of corresponding detection locations in the detection plane. The first photodetector is operative to receive and detect the portion of each of the first plurality of laser pulses reflected off of the object. The lidar system may further include a second photodetector configured to be translated through the second plurality of corresponding detection locations in the detection plane. The second photodetector is operative to receive and detect the portion of each of the second plurality of laser pulses reflected off of the object. The lidar system may further include a processor coupled to the first laser source, the second laser source, the first photodetector, and the second photodetector. The processor may be configured to determine a time of flight for each of the first plurality of laser pulses and each of the second plurality of laser pulses from emission to detection, and construct a three-dimensional image of the object based on the determined time of flight for each of the first plurality of laser pulses and each of the second plurality of laser pulses.

These and other embodiments of the invention along with many of its advantages and features are described in more detail in conjunction with the text below and attached figures.

DETAILED DESCRIPTION OF SPECIFIC EMBODIMENTS

The present invention relates generally to lidar systems for three-dimensional imaging. More specifically, the present invention relates to scanning lidar systems and methods of three-dimensional imaging using inexpensive flexures that are suitable for autonomous vehicles, drones and other applications. Merely by way of example, embodiments of the present invention provide scanning lidar systems that comprise a plurality of laser sources and a plurality of photodetectors configured to be scanned synchronously to provide a desired angular field of view.

Figure 1:
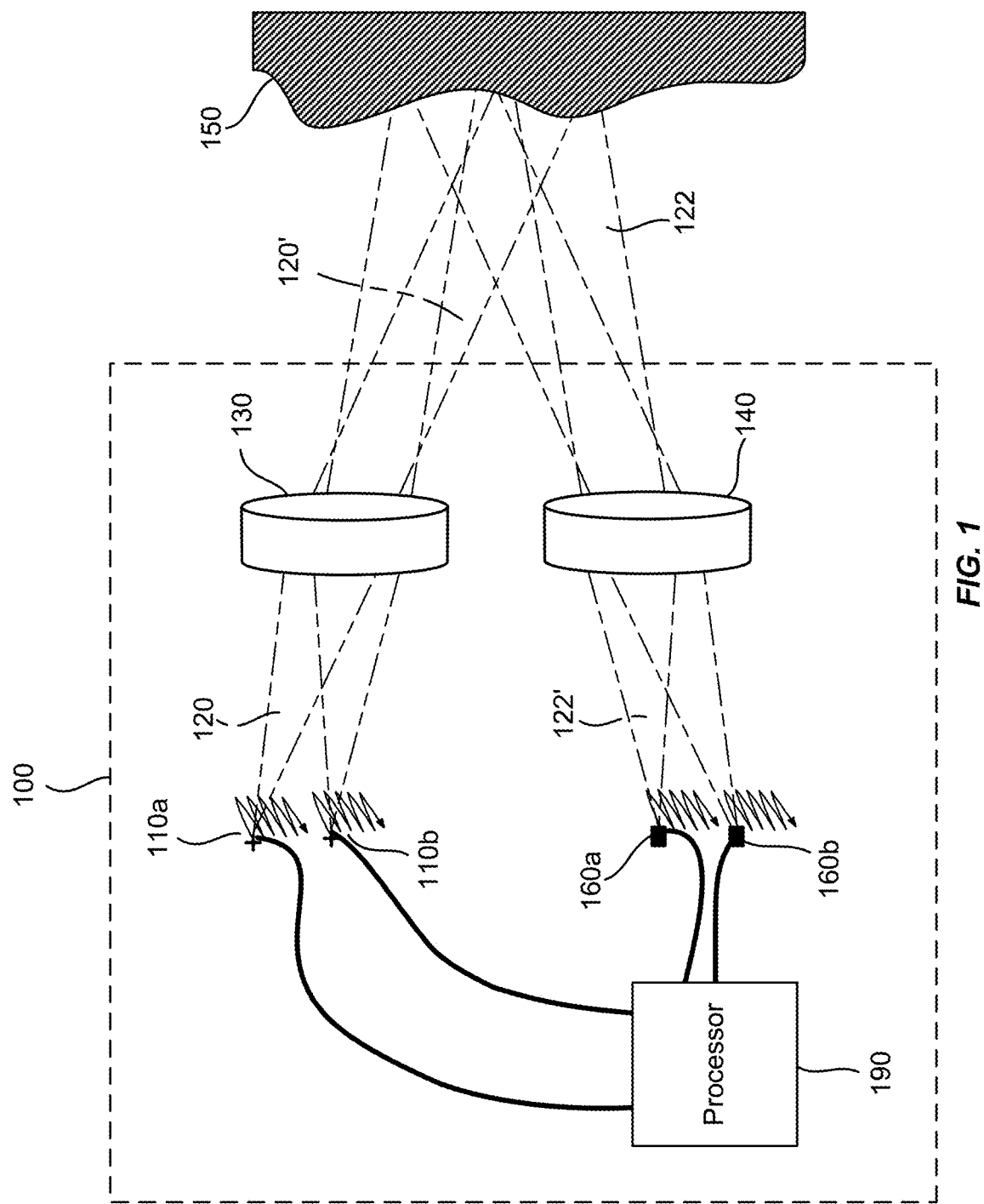
FIG. 1 illustrates schematically a lidar system for three-dimensional imaging according to an embodiment of the present invention.

FIG. 1 illustrates schematically a lidar system 100 for three-dimensional imaging according to an embodiment of the present invention. The lidar system 100 includes an emitting lens 130 and a receiving lens 140, both being fixed. The lidar system 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the lidar system 100. For a given emission location of the laser source 110a, the collimated laser pulse 120' is directed at a corresponding angle toward the object 150.

A portion 122 of the laser pulse 120 is reflected off of the object 150 toward the receiving lens 140. The receiving lens 140 is configured to focus the portion 122 of the laser pulse 120 reflected off of the object 150 onto a corresponding detection location in the focal plane of the receiving lens 140. The lidar system 100 further includes a photodetector 160a disposed substantially at the focal plane of the receiving lens 140. The photodetector 160a is configured to receive and detect the portion 122 of the laser pulse 120 reflected off of the object at the corresponding detection location. The corresponding detection location of the photodetector 160a is conjugate with the respective emission location of the laser source 110a.

The laser pulse 120 may be of a short duration, for example, 100 ns pulse width. The lidar system 100 further includes a processor 190 coupled to the laser source 110a and the photodetector 160a. The processor 190 is configured to determine a time of flight (TOF) of the laser pulse 120 from emission to detection. Since the laser pulse 120 travels at the speed of light, a distance between the lidar system 100 and the object 150 may be determined based on the determined time of flight.

According to some embodiments, the laser source 120a may be raster scanned to a plurality of emission locations in the back focal plane of the emitting lens 130, and is configured to emit a plurality of laser pulses at the plurality of emission locations. Each laser pulse emitted at a respective emission location is collimated by the emitting lens 130 and directed at a respective angle toward the object 150, and incidents at a corresponding point on the surface of the object 150. Thus, as the laser source 120a is raster scanned within a certain area in the back focal plane of the emitting lens 130, a corresponding object area on the object 150 is scanned. The photodetector 160a is raster scanned to a plurality of corresponding detection locations in the focal plane of the receiving lens 140. The scanning of the photodetector 160a is performed synchronously with the scanning of the laser source 110a, so that the photodetector 160a and the laser source 110a are always conjugate with each other at any given time.

By determining the time of flight for each laser pulse emitted at a respective emission location, the distance from the lidar system 100 to each corresponding point on the surface of the object 150 may be determined. In some embodiments, the processor 190 is coupled with a position encoder that detects the position of the laser source 110a at each emission location. Based on the emission location, the angle of the collimated laser pulse 120' may be determined. The X-Y coordinate of the corresponding point on the surface of the object 150 may be determined based on the angle and the distance to the lidar system 100. Thus, a three-dimensional image of the object 150 may be constructed based on the measured distances from the lidar system 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the lidar system 100 may be estimated based on the scanning range of the laser source 110a and the focal length of the emitting lens 130 as, $$AFOV = 2\tan^{-1}\left(\frac{h}{2f}\right),$$

where h is scan range of the laser source 110a along certain direction, and f is the focal length of the emitting lens 130. For a given scan range h, shorter focal lengths would produce wider AFOVs. For a given focal length f, larger scan ranges would produce wider AFOVs. In some embodiments, the lidar system 100 may include multiple laser sources disposed as an array at the back focal plane of the emitting lens 130, so that a larger total AFOV may be achieved while keeping the scan range of each individual laser source relatively small. Accordingly, the lidar system 100 may include multiple photodetectors disposed as an array at the focal plane of the receiving lens 140, each photodetector being conjugate with a respective laser source. For example, the lidar system 100 may include a second laser source 110b and a second photodetector 160b, as illustrated in FIG. 1. In other embodiments, the lidar system 100 may include four laser sources and four photodetectors, or eight laser sources and eight photodetectors. In one embodiment, the lidar system 100 may include 8 laser sources arranged as a 4×2 array and 8 photodetectors arranged as a 4×2 array, so that the lidar system 100 may have a wider AFOV in the horizontal direction than its AFOV in the vertical direction. According to various embodiments, the total AFOV of the lidar system 100 may range from about 5 degrees to about 15 degrees, or from about 15 degrees to about 45 degrees, or from about 45 degrees to about 90 degrees, depending on the focal length of the emitting lens, the scan range of each laser source, and the number of laser sources.

The laser source 110a may be configured to emit laser pulses in the ultraviolet, visible, or near infrared wavelength ranges. The energy of each laser pulse may be in the order of microjoules, which is normally considered to be "eye-safe." For laser sources operating in wavelengths greater than about 1500 nm, the energy levels could be higher as the eye does not focus at those wavelengths. The photodetector 160a may comprise a silicon avalanche photodiode, a photomultiplier, a PIN diode, or other semiconductor sensors.

The angular resolution of the lidar system 100 can be effectively diffraction limited, which may be estimated as, $$\theta = 1.22\lambda/D,$$

where λ is the wavelength of the laser pulse, and D is the diameter of the lens aperture. According to various embodiments, the angular resolution of the lidar system 100 may range from about 1 mrad to about 20 mrad (about 0.05-1.0 degrees), depending on the type of lenses.

In some embodiments, the laser sources and the photodetectors may be scanned using relatively low-cost flexure mechanisms, as described below.

Figure 2:
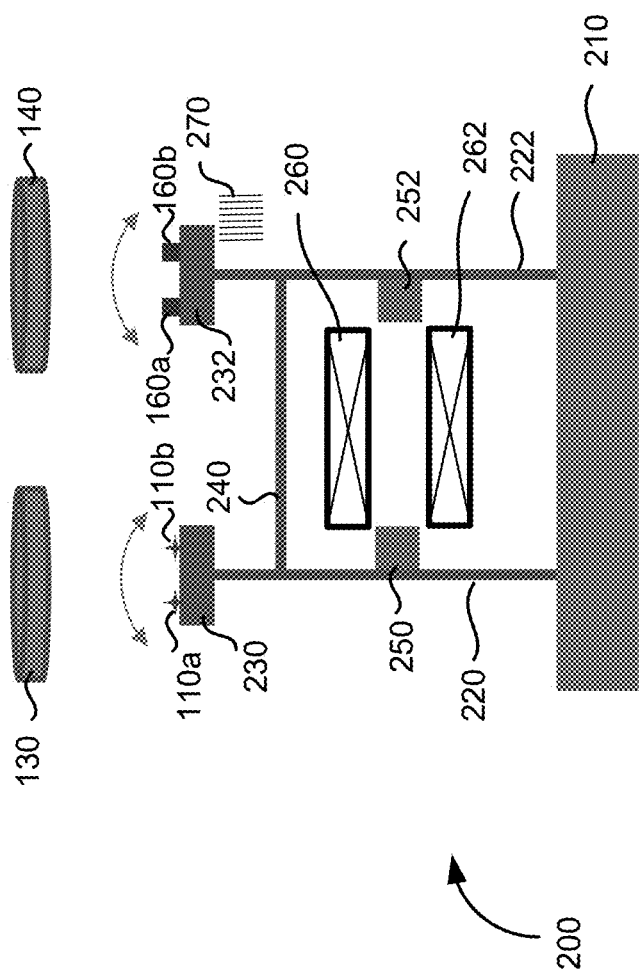
FIG. 2 illustrates schematically a flexure mechanism for scanning one or more laser sources and one or more photodetectors in a lidar system according to an embodiment of the present invention.

FIG. 2 illustrates schematically a flexure mechanism 200 that may be used for scanning the one or more laser sources 110a and 110b and the one or more photodetectors 160a and 160b in the lidar system 100 illustrated in FIG. 1, according to an embodiment of the present invention. The flexure mechanism 200 includes a fixed base 210, a first flexure 220, and a second flexure 222. The base end of each of the first flexure 220 and the second flexure 222 are attached to the base 210. A first platform 230 is attached to the free end of the first flexure 230 for mounting one or more laser sources 110a and 110b thereon. A second platform 232 is attached to the free end of the second flexure 232 for mounting one or more photodetectors 160a and 160b thereon.

The first flexure 220 is configured such that its free end may be deflected laterally when actuated, thereby translating the one or more laser sources 110a and 110b substantially in the back focal plane of the emitting lens 130. Similarly, the second flexure 222 is configured such that its free end may be deflected laterally when actuated, thereby translating the one or more photodetectors 160a and 160b substantially in the focal plane of the receiving lens 140. In one embodiment, the free end of the first flexure 220 and the free end of the second flexure 222 are mechanically linked with each other through a tie bar 240, so that the distance between each photodetector 160a or 160b and the corresponding laser source 110a or 110b remains constant as they are being scanned. This would ensure that each photodetector 160a or 160b is always conjugate with the corresponding laser source 110a or 110b, provided that the lens prescriptions for the emitting lens 130 and the receiving lens 140 are essentially identical.

In this embodiment where the first flexure 220 and the second flexure 222 are mechanically linked by the tie bar 240, the first flexure 220 and the second flexure 222 may be actuated by a single actuator. For example, they may be actuated simultaneously by the voice coils 260 and 262 and the permanent magnets 250 and 252 as illustrated in FIG. 2. When the voice coils 260 and 262 are energized, the first flexure 220 and the second flexure 222 may be deflected by the magnetic force in the desired direction. The voice coils 260 and 262 may be operated from direct current (DC) to a frequency significantly above the resonance frequency of the flexure assembly. In one embodiment, they may be operated at the resonance frequency. In that case, a large amplitude may be generated with highest efficiency. In another embodiment, the magnets 250 and 252 are held fixed while the coils 260 and 262 move. In other embodiments, the first flexure 220 and the second flexure 222 may be actuated by other types of actuators, such as piezoelectric actuators and cams driven by electric motors, and the like. One of ordinary skill in the art would recognize many variations, alternatives, and modifications.

In some embodiments, the lidar system 100 may include a position encoder 270 located behind the second platform 232. The position encoder 270 may be configured to detect the positions of the photodetector 160a with respect to a reference position. The position encoder 270 may input the positions of the photodetector 160a to the processor 190. The processor 190 may determine the positions of the laser source 110a based on the positions of the photodetector 160a, since the position of the laser source 110a and the position of the photodetector 160a are always conjugate with each other. The processor 190 may use the positions of the laser source 110a to construct the three-dimensional image of the object 150. In an alternative embodiment, the position encoder 270 may be positioned behind the first platform 230 and configured to detect the positions of the laser source 160a with respect to a reference position, and may input the positions of the laser source 110a to the processor 190. The position encoder 270 may be a magnetic encoder, an optical encoder, a capacitive sensor, a Hall sensor, or any other encoder type known to those skilled in the art.

Figure 3:
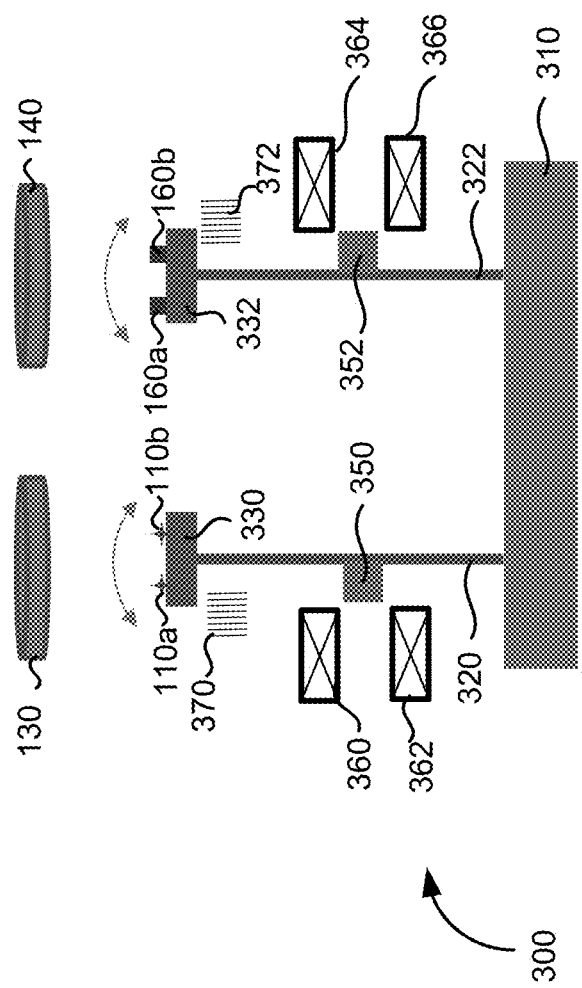
FIG. 3 illustrates schematically a flexure mechanism for scanning one or more laser sources and one or more photodetectors in a lidar system according to another embodiment of the present invention.

FIG. 3 illustrates schematically a flexure mechanism 300 that may be used for scanning the laser sources 110a and 110b and the photodetectors 160a and 160b in the lidar system 100 illustrated in FIG. 1, according to another embodiment of the present invention. Similar to the flexure mechanism 200, the flexure mechanism 300 includes a fixed base 310, a first flexure 320, and a second flexure 322. Each of the base end of the first flexure 320 and the base end of the second flexure 322 are attached to the base 310. A first platform 330 is attached to the free end of the first flexure 320 for mounting one or more laser sources 110a and 110b thereon. A second platform 332 is attached to the free end of the second flexure 322 for mounting one or more photodetectors 160a and 160b thereon. Here, unlike the flexure mechanism 200 illustrated in FIG. 2, the free end of the first flexure 320 and the free end of the second flexure 322 are not mechanically linked, and they are actuated by separate actuators. In one embodiment, the first flexure 320 may be actuated by the voice coils 360 and 362, and the permanent magnet 350; the second flexure 322 may be actuated by the voice coils 364 and 366, and the permanent magnet 352, as illustrated in FIG. 3. In other embodiments, other types of actuators, such as piezoelectric actuators and cams driven by electric motors, and the like, may be used.

The first flexure 320 and the second flexure 322 may be actuated synchronously using an electronic control circuitry so that the position of each photodetector 160a or 160b is always conjugate with the position of the corresponding laser source 110a or 110b. In one embodiment, the lidar system 100 further includes a first position encoder 370 located behind the first platform 330 for detecting positions of the laser source 110a with respect to a reference position, and a second position encoder 372 located behind the second platform 332 for detecting positions of the photodetector 160a with respect to a reference position. The first position encoder 370 and the second position encoder 372 may be coupled to the processor 190. The processor 190 may generate an electronic feedback signal based on a comparison between the position of the laser source 110a and the position of the photodetector 160a, and uses the electronic feedback signal to synchronize the actuation of the first flexure 320 and the actuation of the second flexure 322, so that the position of the laser source 110a and the position of the photodetector 160a are always conjugate with each other.

Figure 4:
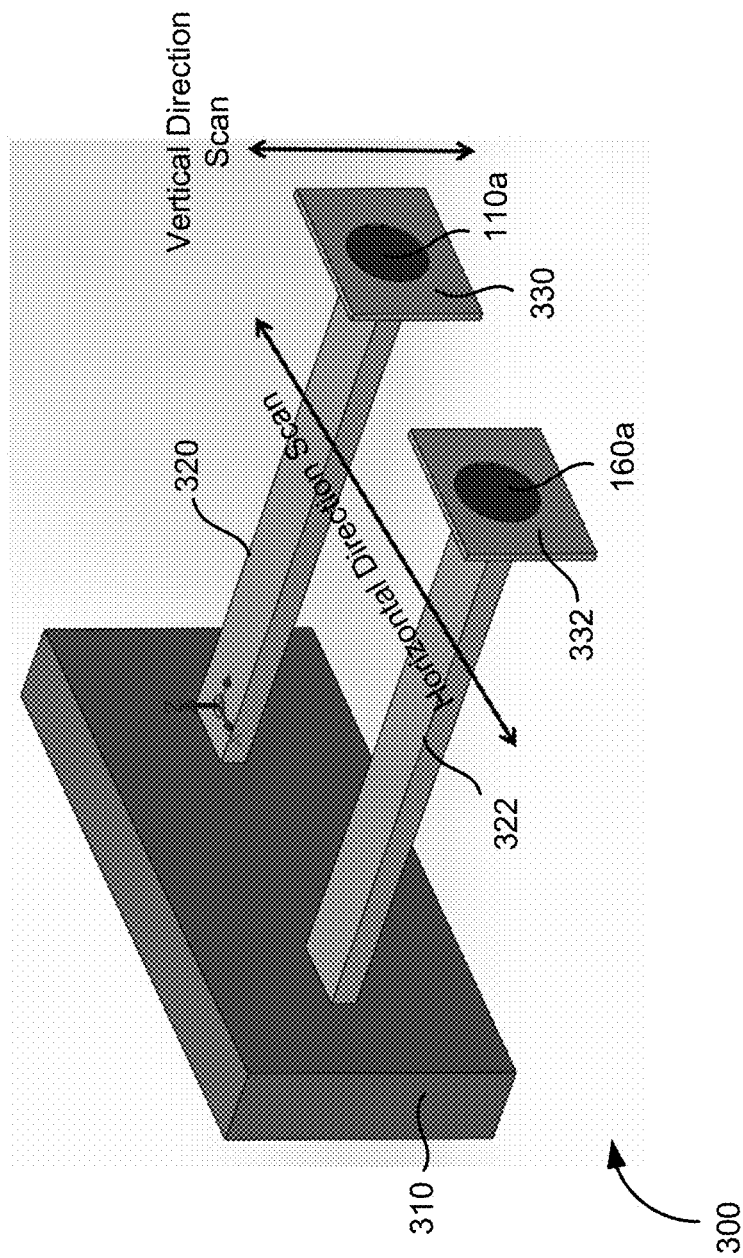
FIG. 4 illustrates schematically a flexure mechanism for scanning one or more laser sources and one or more photodetectors in a lidar system according in two dimensions according to an embodiment of the present invention.

The flexure mechanism 200 illustrated in FIG. 2, or the flexure mechanism 300 illustrated in FIG. 3, may be configured to scan the laser source 110a and the photodetector 160a in two dimensions. FIG. 4 illustrates schematically a perspective view of the flexure mechanism 300. The first flexure 320 and the second flexure 322 are essentially cantilevers with their base ends fixed to the base 310. Each of the free end of the first flexure 320 and the free end of the second flexure 322 may be deflected in the vertical direction as well as in the horizontal direction, as indicated by the arrows in FIG. 4. In some embodiments, the first flexure 320 and the second flexure 322 may be raster scanned in the horizontal direction with a first speed, and raster scanned in the vertical direction with a second speed less than the first speed, or vice versa. By choosing the resonant frequencies for the orthogonal directions to be far apart from each other, actuation and control of the raster scanning may be accomplished. It should be understood that, although a single laser source 110a and a single photodetector 160a are shown in FIG. 4, a plurality of laser sources may be mounted on the platform 330 attached to the first flexure 320, and a plurality of photodetectors may be mounted on the platform 332 attached to the second flexure 332.

Figure 5:
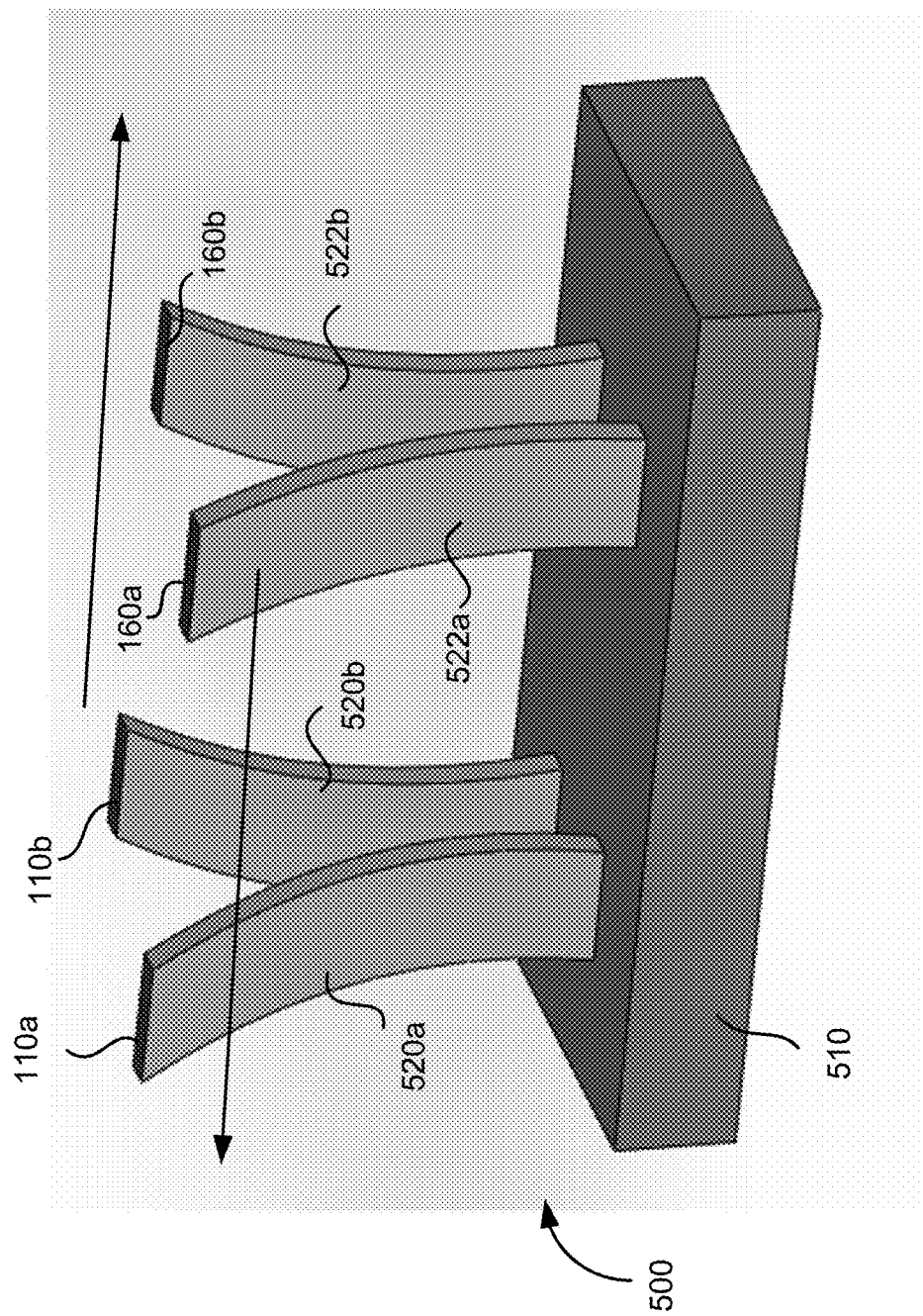
FIG. 5 illustrates schematically a flexure mechanism for scanning a plurality of laser sources and a plurality of photodetectors in a lidar system according to an embodiment of the present invention.

When cantilever-type flexures, such as those illustrated in FIGS. 2-4, are actuated at high frequencies, vibrations may be introduced due to the high accelerations at the extreme ends of the motions. According to some embodiments of the present invention, counter-balancing pairs of flexures may be used to reduce vibrations. FIG. 5 illustrates schematically a counter-balancing flexure mechanism 500 according to an embodiment of the present invention. The flexure mechanism 500 includes a base 510, a first flexure 520a and a second flexure 520b disposed side-by-side, a third flexure 522a and a fourth flexure 522b disposed side-by-side. The base end of each of the flexures 520a, 520b, 522a, and 522b is attached to the base 510. One or more laser sources 110a are attached to the free end of the first flexure 520a, and one or more laser sources 110b are attached to the free end of the second flexure 520b. One or more photodetectors 160a are attached to the free end of the third flexure 522a, and one or more photodetectors 160b are attached to the free end of the fourth flexure 522b. In one embodiment, the first flexure 520a and the third flexure 522a move in opposite directions with respect to the second flexure 520b and the fourth flexure 522b, both in the left-right direction and in the forward-backward direction. That is, at a given time, the first flexure 520a and the third flexure 522a may move to the left and forward, while the second flexure 520b and the fourth flexure 522b may move to the right and backward, as illustrated in FIG. 5. In this fashion, the motion of the first flexure 520a may counter balance the motion of the second flexure 520b, and the motion of the third flexure 522a may counter balance the motion of the fourth flexure 522b, thereby canceling most of the vibrations. In some embodiments, the movement of the first flexure 520a and the movement of the third flexure 522a are synchronized such that the position of the laser source 110a and the position of the photodetector 160a are always conjugate with respect to each other. Similarly, the movement of the second flexure 520b and the movement of the fourth flexure 522b are synchronized such that the position of the laser source 110b and the position of the photodetector 160b are always conjugate with respect to each other. The counter-balancing motions of the flexures 520a, 520b, 522a, and 522b may be achieved by using electrical control signals from the processor 190. In alternative embodiments, dummy flexures may be used for vibration cancellation.

Figure 6:
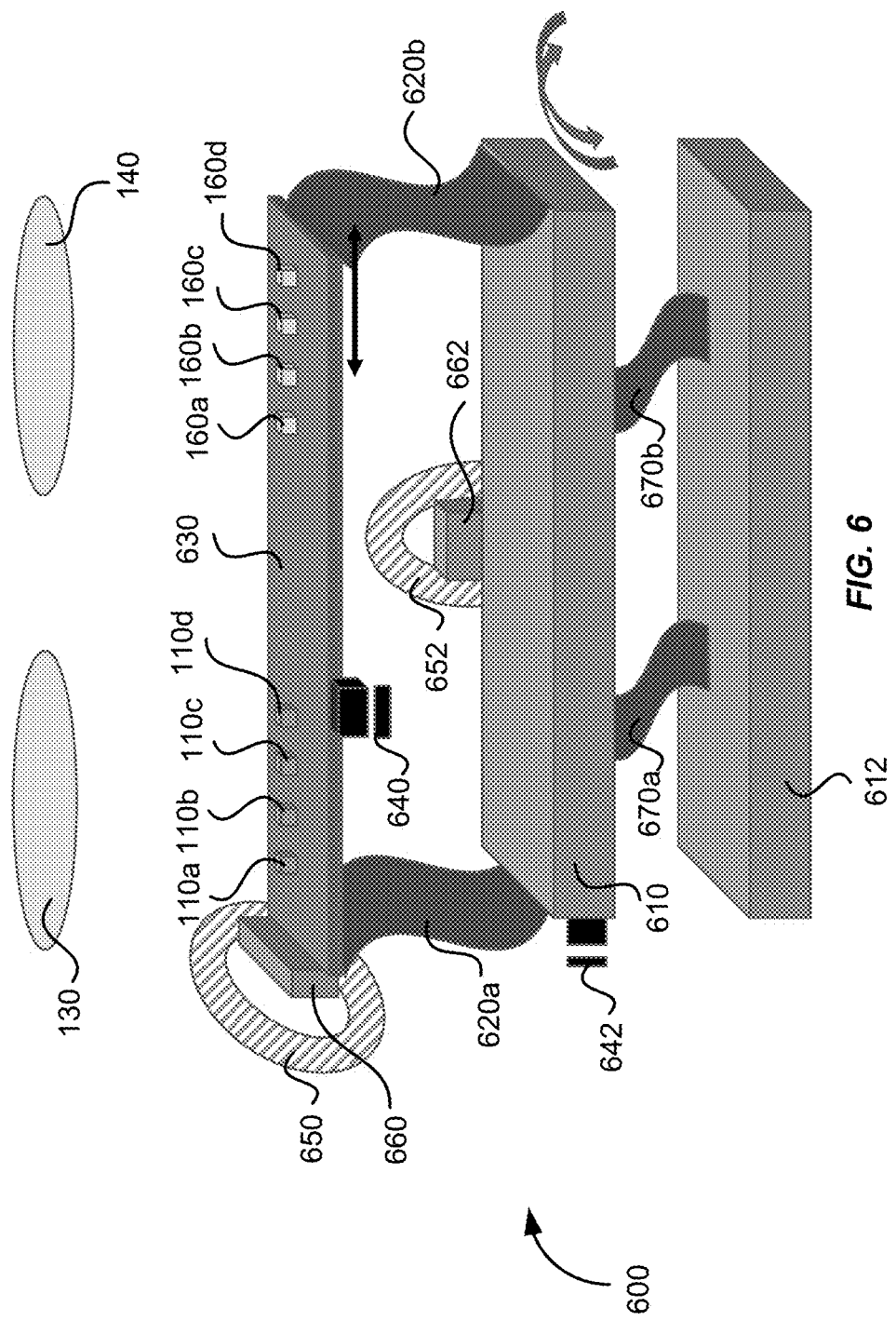
FIG. 6 illustrates schematically a flexure mechanism for scanning one or more laser sources and one or more photodetectors in a lidar system according to another embodiment of the present invention.

FIG. 6 illustrates schematically a flexure mechanism 600 that may be used for scanning one or more laser sources 110a-110d and one or more photodetectors 160a-160d in the lidar system 100 illustrated in FIG. 1, according to another embodiment of the present invention. In this example, four laser sources 110a-110d and four photodetectors 160a-160d are mounted on a same rigid platform 630. The positions of the laser sources 110a-110d and the photodetectors 160a-160d are arranged such that each laser source 110a, 110b, 110c, or 110d is spatially conjugate with a corresponding photodetector 160a, 160b, 160c, or 160d. The platform 630 is coupled to a first base plate 610 by a first flexure comprising two flexure elements 620a and 620b. The flexure elements 620a and 620b may be deflected to the left or right by using a single actuator, such as the voice coil 650 and permanent magnet 660 as shown in FIG. 6, or by a piezoelectric actuator, and the like. In one embodiment, the first base plate 610 may be coupled to a second base plate 612 by a second flexure comprising two flexure elements 670a and 670b. The flexure elements 670a and 670b may be deflected forward or backward by using a single actuator, such as the voice coil 652 and the permanent magnet 662 as shown in FIG. 6, or by a piezoelectric actuator, and the like.

Thus, the laser sources 110a-110d and the photodetectors 160a-160d may be scanned in two dimensions in the focal planes of the emitting lens 130 and the receiving lens 140, respectively, by the left-right movements of the flexure elements 620a and 620b, and by the forward-backward movements of the flexure elements 670a and 670b. Because the laser sources 110a-110d and the photodetectors 160a-160d are mounted on the same rigid platform 630, the conjugate spatial relationship between each laser-photodetector pair is maintained as they are scanned, provided that the lens prescriptions for the emitting lens 130 and the receiving lens 140 are essentially identical. It should be appreciated that, although four laser sources 110a-110d and four photodetectors 160a-160d are shown as an example in FIG. 6, fewer or more laser sources and fewer or more photodetectors may be mounted on a single platform 630. For example, one laser source and one photodetector, or two laser sources and two photodetectors, or eight laser sources and eight photodetectors may be mounted on a single platform 630, according to various embodiments of the present invention. In one embodiment, eight laser sources may be arranged as a 4×2 array, and eight photodetectors may be arranged as a 4×2 array, all mounted on the same rigid platform 630.

In some embodiments, a first position encoder 640 may be disposed adjacent the platform 630 for detecting coordinates of the laser sources 110a-110d in the left-right direction (i.e., the x-coordinates), and a second position encoder 642 may be disposed adjacent the first base plate 610 for detecting coordinates of the laser sources 110a-110d in the forward-backward direction (i.e., the y-coordinates). The first position encoder 640 and the second position encoder 642 may input the x-y coordinates of the laser sources 110a-110d to the processor 190 to be used for constructing the three-dimensional image of the object 150.

Figure 7:
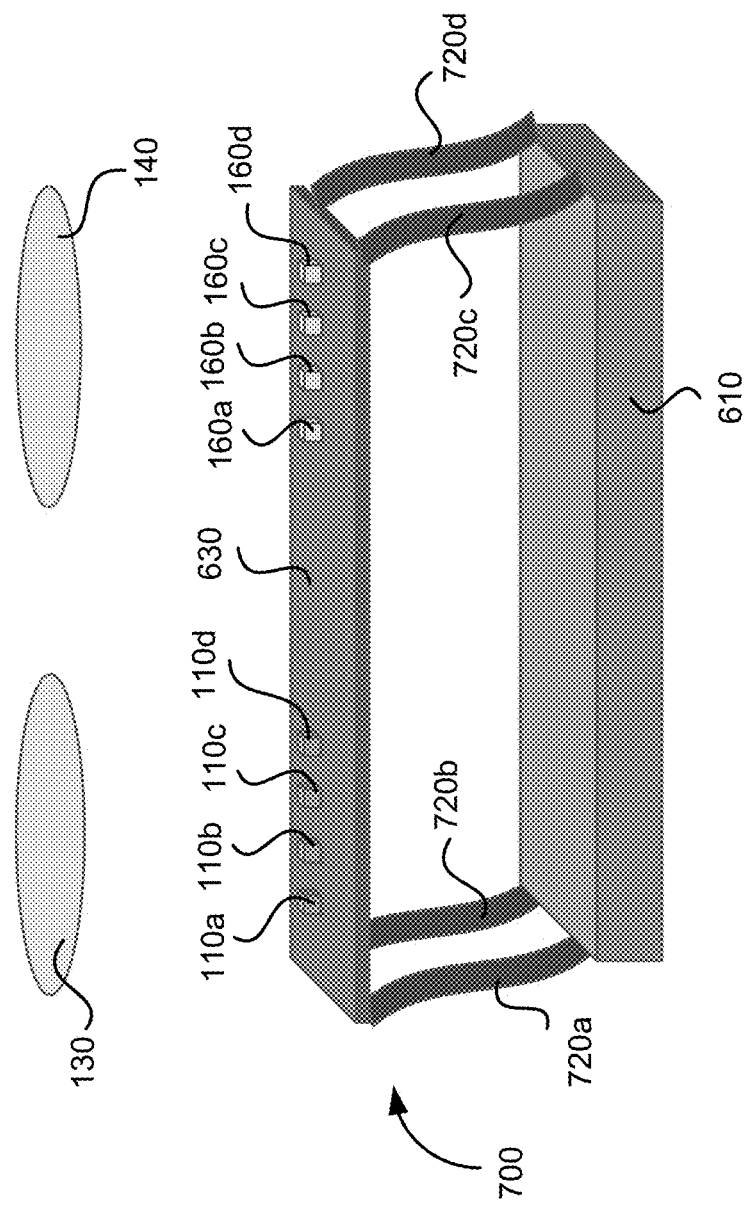
FIG. 7 illustrates schematically a flexure mechanism for scanning one or more laser sources and one or more photodetectors in a lidar system according to yet another embodiment of the present invention.

FIG. 7 illustrates schematically a flexure mechanism 700 that may be used for scanning one or more laser sources 110a-110d and one or more photodetectors 160a-160d in the lidar system 100 illustrated in FIG. 1, according to yet another embodiment of the present invention. Similar to FIG. 6, the laser sources 110a-110d and the photodetectors 160a-160d are mounted to the same rigid platform 630. Here, the platform 630 is coupled to the fixed base 610 by a flexure comprising four flexure elements 720a-720d. The four flexure elements 720a-720d may be deflected laterally in both the left-right direction and the backward-forward direction, thereby allowing the laser sources 110a-110d and the photodetectors 160a-160d to be scanned in two dimensions. Similar to the flexure mechanism 600 shown in FIG. 6, because the laser sources 110a-110d and the photodetectors 160a-160d are mounted on the same rigid platform 630, the conjugate spatial relationship between each laser-photodetector pair is maintained as they are scanned.

Figure 8:
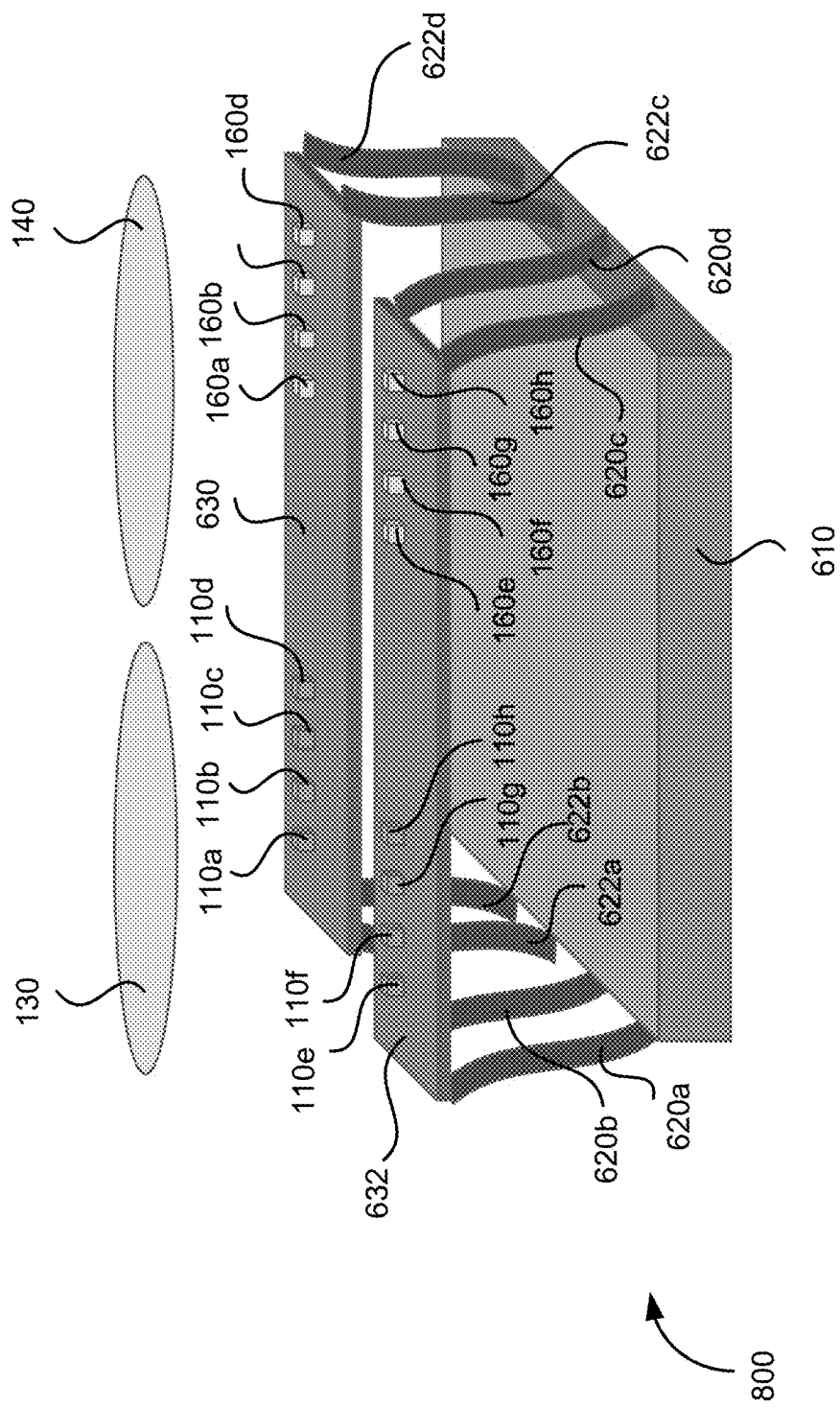
FIG. 8 illustrates schematically a flexure mechanism for scanning a plurality of laser sources and a plurality of photodetectors in a lidar system according to an embodiment of the present invention.

FIG. 8 illustrates schematically a flexure mechanism 800 that may be used for scanning a plurality of laser sources 110a-110h and a plurality of photodetectors 160a-160h in the lidar system 100 illustrated in FIG. 1, according to a further embodiment of the present invention. In this example, four laser sources 110a-110d and four photodetectors 160a-160d are mounted on a first rigid platform 630, and another four laser sources 110e-110h and another four photodetectors 160e-160h are mounted on a second rigid platform 632. The first rigid platform 630 is coupled to the fixed base 610 by a first flexure comprising four flexure elements 720a-720d. The second rigid platform 632 is coupled to the fixed base 610 by a second flexure comprising four flexure elements 722a-722d. According to one embodiment, the first platform 630 and the second platform 632 are configured to move in opposite directions, so that most of the vibrations may be canceled. For example, the first platform 630 may move to the left as the second platform 632 moves to the right, as illustrated in FIG. 8. Similarly, the first platform 630 may move to forward as the second platform 632 moves backward. It should be appreciated that, although only two platforms 630 and 632 are shown in this example, more pairs of platforms for additional laser sources and photodetectors may be used. One of ordinary skill in the art would recognize many variations, alternatives, and modifications.

Figure 9:
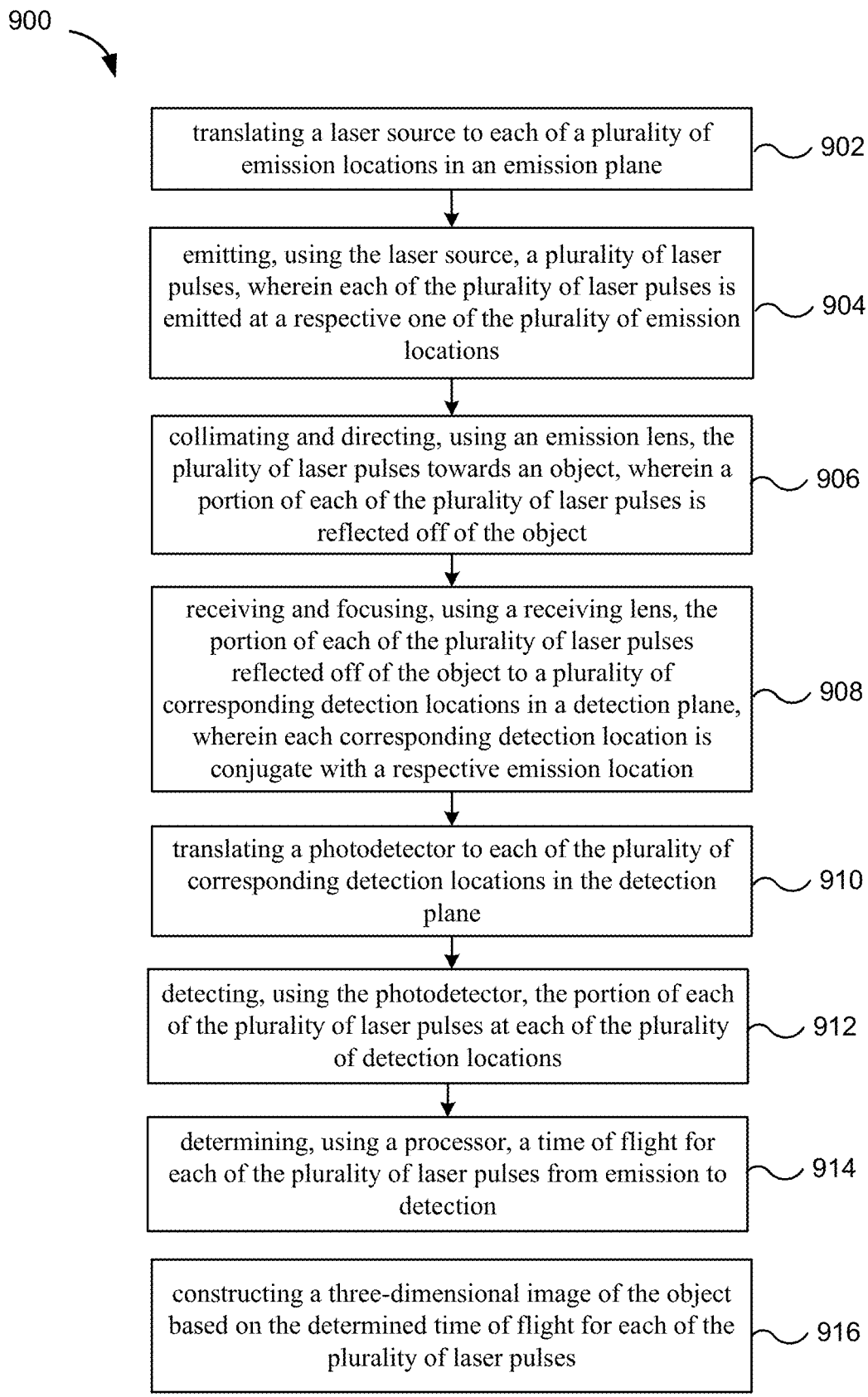
FIG. 9 shows a simplified flowchart illustrating a method of three-dimensional imaging using a lidar system according to an embodiment of the present invention.

In one aspect, embodiments of the present invention provide methods of performing three-dimensional imaging using a lidar system. FIG. 9 shows a simplified flowchart illustrating a method 900 of three-dimensional imaging using a lidar system, such as the lidar system 100 illustrated in FIG. 1, according to an embodiment of the present invention. The method 900 may include, at 902, translating a laser source to each of a plurality of emission locations in an emission plane, and at 904, emitting, using the laser source, a plurality of laser pulses. Each of the plurality of laser pulses is emitted at a respective one of the plurality of emission locations. The method 900 may further include, at 906, using an emission lens to collimate and direct the plurality of laser pulses towards an object in front of the lidar system. A portion of each of the plurality of laser pulses may be reflected off of the object. The method 900 may further include, at 908, using a receiving lens to receive and focus the portion of each of the plurality of laser pulses reflected off of the object to a plurality of corresponding detection locations in a detection plane. Each corresponding detection location is conjugate with a respective emission location. The method 900 may further include, at 910, translating a photodetector to each of the plurality of corresponding detection locations in the detection plane, and at 912, detecting, using the photodetector, the portion of each of the plurality of laser pulses at each of the plurality of detection locations. The method 900 may further include, at 914, determining, using a processor, a time of flight for each of the plurality of laser pulses from emission to detection, and at 916, constructing a three-dimensional image of the object based on the determined time of flight for each of the plurality of laser pulses.

It should be appreciated that the specific steps illustrated in FIG. 9 provide a particular method of performing three-dimensional imaging using a lidar system according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

In some embodiments, translating the photodetector to each of the plurality of corresponding detection locations in the detection plane is performed synchronously with translating the laser source to each of the plurality of emission locations in the emission plane, such that a location of the photodetector is always conjugate with a location of the laser source at any given time. In one embodiment, the laser source and the photodetector are mounted on a same platform, and translating the laser source and translating the photodetector are performed by translating the platform.

In some embodiments, translating the laser source in the emission plane through the plurality of emission locations comprises raster scanning the laser source in the emission plane, and translating the photodetector in the detection plane through the plurality of corresponding detection locations comprises raster scanning the photodetector in the detection plane. In some embodiments, the emission plane and the detection plane are substantially perpendicular to an optical axis of the lidar system. Raster scanning of the laser source may be performed in two-dimensions in the emission plane, and raster scanning of the detector may be performed in two-dimensions in the detector plane. In some embodiments, raster scanning of the laser source and raster scanning of the photodetector in a first direction may be performed at a first speed, and raster scanning of the laser source and raster scanning of the photodetector in a second direction orthogonal to the first direction may be performed at a second speed less than the first speed.

In various embodiments, raster scanning of the laser source may result in a position of the laser source as a function of time that follows a sinusoidal waveform, or a triangular waveform, or a sawtooth waveform, or the like. In some embodiments, the raster scanning of the laser source in a first direction may result in a position of the laser source in the first direction as a function of time that follows a first waveform, and raster scanning of the laser source in a second direction may result in a position of the laser source in the second direction as a function of time that follows a second waveform different from the first waveform. One of ordinary skill in the art would recognize many variations, alternatives, and modifications.

In some embodiments, the intensity of each return laser pulse is measured and used to adjust the power of subsequent laser pulses from the same emission point. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

According to various embodiments, each laser source may be configured to emit laser pulses at regular time intervals at certain repetition rate, such as 10 kHz or the like. For a lidar system that includes a plurality of laser sources, the plurality of laser sources may be configured to emit laser pulses simultaneously at same time intervals, or may be configured to emit laser pulses at staggered time intervals, according to various embodiments of the present invention. For example, in one embodiment, a first laser source may be configured to emit laser pulses at a pulse repetition rate of 10 kHz, which corresponds to a time interval between consecutive pulses $\Delta T=100$ μs. A second laser source may be configured to emit laser pulses also at the pulse repetition rate of 10 kHz, but is staggered with respect to that of the first laser source with a time delay $\Delta t$ that is less than the time interval $\Delta T$ between consecutive pulses. For example, the delay time between firing of the second laser source and the firing of the first laser source may be $\Delta t=10$ μs.

In one embodiment, where a first laser source and a second laser source are configured to emit laser pulses at staggered time intervals, the electrical signals generated by the first photodetector and the second photodetector may be input into a single analog-to-digital converter (ADC) in the processor for measuring the times of flight for the trains of pulses emitted by both the first laser source and the second laser source, as long as the time of flight is always shorter than the time between laser pulses. In other embodiments, the electrical signals generated by the first photodetector and the second photodetector may be input into separate ADCs.

In embodiments where raster scanning of the laser source results in a position of the laser source as a function of time that follows a waveform other than a triangular waveform or a sawtooth waveform, the speed of scanning may vary with the position of the laser source. For example, in the case of a sinusoidal waveform, the speed of scanning may be slower at the extreme ends of the motion than at other positions. In such cases, if the laser source is configured to emit laser pulses at constant time intervals, the angular spacing between two adjacent laser pulses may vary with the scanning speed. In some embodiments, the laser source may be configured to emit laser pulses at non-uniform time intervals to compensate for the non-uniformity of scanning speed, so that the angular spacing between two adjacent laser pulses may be independent of the scanning speed. In other embodiments, the laser source is configured to emit laser pulses at constant time intervals regardless of the waveform of the scanning motion. In such cases, a position encoder may measure the positions of the laser source where a series of laser pulses are emitted. The processor may then determine the corresponding angles for the series of laser pulses based on the positions of the laser source.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A lidar system for three-dimensional imaging, the lidar system comprising:
a fixed frame;
one or more lenses attached to the fixed frame;
a platform movably coupled to the fixed frame via a set of flexures;
one or more laser sources and one or more corresponding detectors mounted on the platform and positioned substantially at a focal plane of the one more lenses, wherein:
the one or more lenses are configured to:
project laser pulses emitted by each respective laser source onto one or more objects, a portion of each laser pulse being reflected by the one or more objects; and
focus the portion of each laser pulse reflected by the one or more objects onto a corresponding detector;
a drive mechanism configured to, via the set of flexures, translate the platform relative to the fixed frame in two dimensions transverse to an optical axis of the one or more lenses, wherein each respective laser source of the one or more laser sources and each corresponding detector of the one or more corresponding detectors remain optically conjugate with respect to each other as the platform is translated; and
a processor coupled to the one or more laser sources and the one or more detectors, the processor configured to:
determine a time of flight for each laser pulse from emission to detection; and
construct a three-dimensional image of the one or more objects based on the determined time of flight for each laser pulse.

2. The lidar system of claim 1 wherein the one or more lenses include a first lens and a second lens, the first lens configured to project the laser pulses emitted by each respective laser source onto the one or more objects, and the second lens configured to focus the portion of each laser pulse reflected by the one or more objects onto the corresponding detector.

3. The lidar system of claim 1 wherein the set of flexures comprises a set of flexible beams, each flexible beam coupling the platform to the fixed frame.

4. The lidar system of claim 3 wherein the set of flexible beams comprises four flexible beams, each flexible beam coupling a respective corner of the platform to the fixed frame.

5. The lidar system of claim 1 wherein the drive mechanism comprises one of a voice coil, a linear motor, or a piezoelectric actuator.

6. The lidar system of claim 1 further comprising an encoder mechanism configured to determine a position of the platform in the two dimensions.

7. The lidar system of claim 1 wherein the drive mechanism is configured to translate the platform relative to the fixed frame in a scanning motion with a scanning frequency in one of the two dimensions substantially equal to a resonance frequency of the platform and the set of flexures.

8. The lidar system of claim 1 wherein the drive mechanism is configured to translate the platform relative to the fixed frame in a scanning motion with scanning frequencies in both of the two dimensions substantially equal to corresponding resonance frequencies of the platform and the set of flexures in the two dimensions.

9. The lidar system of claim 1 wherein the drive mechanism is configured to translate the platform relative to the fixed frame at a non-constant speed, and the processor is configured to control firing each respective laser source at a non-constant rate according to the non-constant speed so as to achieve a substantially uniform angular pattern of the laser pulses emitted by each respective laser source.

10. The lidar system of claim 9 wherein the drive mechanism is configured to translate the platform relative to the fixed frame in a sinusoidal waveform.

11. A lidar system for three-dimensional imaging, the lidar system comprising:
a fixed frame;
one or more lenses attached to the fixed frame;
a first platform movably coupled to the fixed frame via a first set of flexures;
a first drive mechanism configured to, via the first set of flexures, translate the first platform relative to the fixed frame in a first dimension transverse to an optical axis of the one or more lenses;
a second platform movably coupled to the first platform via a second set of flexures;
one or more laser sources and one or more corresponding detectors mounted on the second platform and positioned substantially at a focal plane of the one more lenses, wherein:
the one or more lenses are configured to:
project laser pulses emitted by each respective laser source onto one or more objects, a portion of each laser pulse being reflected by the one or more objects; and
focus the portion of each laser pulse reflected by the one or more objects onto a corresponding detector;
a second drive mechanism configured to, via the second set of flexures, translate the second platform relative to the first platform in a second dimension substantially orthogonal to the first dimension and transverse to the optical axis of the one or more lenses; and
a processor coupled to the one or more laser sources and the one or more detectors, the processor configured to:
determine a time of flight for each laser pulse from emission to detection; and
construct a three-dimensional image of the one or more objects based on the determined time of flight for each laser pulse.

12. The lidar system of claim 11 wherein the one or more lenses include a first lens and a second lens, the first lens configured to project the laser pulses emitted by each respective laser source onto the one or more objects, and the second lens configured to focus the portion of each laser pulse reflected by the one or more objects onto the corresponding detector.

13. The lidar system of claim 11 wherein each of the first drive mechanism and the second drive mechanism comprises one of a voice coil, a linear motor, or a piezoelectric actuator.

14. The lidar system of claim 11 further comprising an encoder mechanism configured to determine a position of the second platform in the first dimension and the second dimension.

15. The lidar system of claim 14 wherein the encoder mechanism comprises a first encoder coupled to the first platform for determining the position of the second platform in the first dimension, and a second encoder coupled to the second platform for determining the position of the second platform in the second dimension.

16. The lidar system of claim 11 wherein the first drive mechanism is configured to translate the first platform relative to the fixed frame in a scanning motion with a scanning frequency substantially equal to a resonance frequency of the first platform and the first set of flexures in the first dimension.

17. The lidar system of claim 11 wherein the second drive mechanism is configured to translate the second platform relative to the first platform in a scanning motion with a scanning frequency substantially equal to a resonance frequency of the second platform and the second set of flexures in the second dimension.

18. The lidar system of claim 11 wherein the first drive mechanism is configured to translate the first platform relative to the fixed frame in a scanning motion with a scanning frequency substantially equal to a resonance frequency of the first platform and the first set of flexures in the first dimension, and the second drive mechanism is configured to translate the second platform relative to the first platform in a scanning motion with a scanning frequency substantially equal to a resonance frequency of the second platform and the second set of flexures in the second dimension.

19. The lidar system of claim 11 wherein the first drive mechanism or the second drive mechanism is configured to translate the first platform or the second platform at a non-constant speed, and the processor is configured to control firing each respective laser source at a non-constant rate according to the non-constant speed so as to achieve a substantially uniform angular pattern of the laser pulses emitted by each respective laser source.

20. The lidar system of claim 11 wherein each flexure of the first set of flexures comprises a flexible beam, and each flexure of the second set of flexures comprises a flexible beam.

* * * * *